United States Patent
You et al.

(10) Patent No.: US 11,061,228 B2
(45) Date of Patent: Jul. 13, 2021

(54) HEAD-UP DISPLAY FOR AUTOMOBILE

(71) Applicant: Samsung Display Co., Ltd., Yongin-si (KR)

(72) Inventors: Jaeho You, Gwangmyeong-si (KR); Hyesog Lee, Osan-si (KR); Youngchan Kim, Incheon (KR); Byungchoon Yang, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/413,545

(22) Filed: May 15, 2019

(65) Prior Publication Data

US 2019/0353900 A1  Nov. 21, 2019

(30) Foreign Application Priority Data

May 17, 2018  (KR) ........................ 10-2018-0056361

(51) Int. Cl.
*G02B 27/01* (2006.01)
*G02B 27/30* (2006.01)
*G02B 27/09* (2006.01)
*G09G 3/00* (2006.01)

(52) U.S. Cl.
CPC ....... *G02B 27/0101* (2013.01); *G02B 27/017* (2013.01); *G02B 27/0172* (2013.01); *G02B 27/0944* (2013.01); *G02B 27/0955* (2013.01); *G02B 27/0977* (2013.01); *G02B 27/30* (2013.01); *G09G 3/001* (2013.01)

(58) Field of Classification Search
CPC ............ G02B 27/0101; G02B 27/0172; G02B 27/017; G02B 27/0944; G02B 27/0977; G02B 27/0955; G02B 27/30; G02B 27/0103; G02B 2027/0125; G02B 2027/0105; G09G 3/001

See application file for complete search history.

(56) References Cited

U.S. PATENT DOCUMENTS

| | | | | |
|---|---|---|---|---|
| 4,711,512 A | * | 12/1987 | Upatnieks | G02B 27/4272 345/7 |
| 9,733,475 B1 | * | 8/2017 | Brown | G02B 27/1086 |
| 2010/0134534 A1 | * | 6/2010 | Seesselberg | G02B 27/0081 345/690 |

(Continued)

FOREIGN PATENT DOCUMENTS

KR   10-2016-0056090 A   5/2016

*Primary Examiner* — Brent D Castiaux
(74) *Attorney, Agent, or Firm* — Innovation Counsel LLP

(57) ABSTRACT

A head-up display includes: a plurality of displays having a plurality of pixels and configured to emit lights from each of the plurality of pixels; a plurality of collimators configured to receive the lights emitted from each pixel of the plurality of pixels of the plurality of displays and output collimated lights by collimating the lights; and a diffractive optical element configured to receive the collimated lights from the plurality of collimators, diffract the collimated lights, emit the collimated lights at angles substantially equal to respective angles at which the collimated lights are incident to the diffractive optical element, respectively, and generate a virtual image by the collimated lights emitted from the diffractive optical element. The head-up display is reduced in size and capable of generating the virtual image at infinity to allow drivers to view the virtual image without shifting their focal point.

20 Claims, 17 Drawing Sheets

(56) References Cited

U.S. PATENT DOCUMENTS

| | | | |
|---|---|---|---|
| 2014/0340286 A1* | 11/2014 | Machida | G02B 27/0172 345/8 |
| 2015/0035744 A1* | 2/2015 | Robbins | G02B 27/0172 345/156 |
| 2016/0025973 A1* | 1/2016 | Guttag | G02B 27/0101 345/7 |
| 2016/0327796 A1* | 11/2016 | Bailey | G03H 1/2645 |

* cited by examiner

HEAD-UP DISPLAY FOR AUTOMOBILE

CROSS-REFERENCE TO RELATED APPLICATION

This application claims priority under 35 U.S.C. § 119 to Korean Patent Application No. 10-2018-0056361, filed on May 17, 2018, in the Korean Intellectual Property Office (KIPO), the disclosure of which is incorporated by reference herein in its entirety.

1. TECHNICAL FIELD

Aspects of embodiments of the present disclosure relate to a head-up display for automobiles, motorcycles, or other vehicles, and more particularly, to a head-up display having a reduced size and capable of generating a virtual image at infinity to allow drivers to view the virtual image without shifting their focal point.

2. DISCUSSION OF RELATED ART

Head-up displays for automobiles, motorcycles, or other vehicles present various information for a driver as a virtual image at a position of the driver's main line of sight (i.e., a fixation line) as being superimposed on an external view. For example, the head-up displays project information (e.g., dashboard information and/or navigation information) on the front window that is in the direction of the driver's main line of sight to allow the driver to easily grasp and perceive the information without requiring the driver to look away from an initial viewpoint.

Head-up displays may be largely classified into two types, a windshield type and a combiner type. The windshield type head-up display does not require a change of a driver's focal point because the virtual image that is displayed on the windshield is relatively far from the driver's eyes, but it is generally buried in the dashboard of automobiles due to its large volume. In contrast, a conventional combiner type head-up display has a relatively small volume, but the virtual image is displayed relatively close to the driver's eyes so it may require a shift of the driver's focal point to clearly view the displayed information. This not only causes the driver's inconvenience but also can pose a safety issue.

It is to be understood that this background information is intended to provide useful background for understanding the present disclosure and as such disclosed herein, the background may include ideas, concepts or recognitions that are not a part of what is known or appreciated by those skilled in the pertinent art prior to an effective filing date of the subject matters disclosed herein.

SUMMARY

Embodiments of the present disclosure may be directed to a head-up display that is reduced in size and capable of generating a virtual image at infinity to allow drivers to view the virtual image without shifting their focal point.

According to an embodiment of the present disclosure, a head-up display includes: a plurality of displays having a plurality of pixels and configured to emit lights from each of the plurality of pixels; a plurality of collimators configured to receive the lights emitted from each pixel of the plurality of pixels of the plurality of displays and output collimated lights by collimating the lights; and a diffractive optical element configured to receive the collimated lights from the plurality of collimators, diffract the collimated lights, emit the collimated lights at angles substantially equal to respective angles at which the collimated lights are incident to the diffractive optical element, respectively, and generate a virtual image by the collimated lights emitted from the diffractive optical element.

The plurality of displays may correspond to the plurality of collimators in a one-to-one correspondence.

An eyebox may be placed in front of the diffractive optical element and spaced apart from the diffractive optical element by a viewing distance.

The eyebox may have a trapezoidal shape.

The viewing distance may be proportional to a width of the diffractive optical element at a same field of view (FOY).

The collimator may be one of an achromatic lens, a holographic optical element, and a parabolic mirror.

The diffractive optical element may include a slanted surface grating.

According to an embodiment of the present disclosure, a head-up display includes: a display having a plurality of pixels and configured to emit lights from each of the plurality of pixels; a collimator configured to receive the lights emitted from each pixel of the plurality of pixels of the display and output collimated lights by collimating the lights; and a diffractive optical element configured to receive the collimated lights from the collimator, diffract the collimated lights, emit the collimated lights at angles substantially equal to respective angles at which the collimated lights are incident to the diffractive optical element, respectively, and generate a virtual image by the collimated lights emitted from the diffractive optical element. The diffractive optical element includes a light incidence surface and a light emission surface, at least one of the light incidence surface and the light emission surface is a curved surface, and the curved surface is convex toward a direction away from the collimator.

An eyebox may be placed in front of the diffractive optical element and spaced apart from the diffractive optical element by a viewing distance.

The eyebox may have a rectangular shape.

The collimator may be one of an achromatic lens, a holographic optical element, and a parabolic mirror.

The diffractive optical element may include a slanted surface grating.

According to an embodiment of the present disclosure, a head-up display includes: a display having a plurality of pixels and configured to emit lights from each of the plurality of pixels; a collimator configured to receive the lights emitted from each pixel of the plurality of pixels of the display and output collimated lights by collimating the lights; a diffractive optical element configured to receive the collimated lights from the collimator, diffract the collimated lights, emit the collimated lights at angles substantially equal to respective angles at which the collimated lights are incident to the diffractive optical element, respectively, and generate a virtual image by the collimated lights emitted from the diffractive optical element; and a beam steering apparatus disposed between the collimator and the diffractive optical element, and the beam steering apparatus is configured to adjust directions of the collimated lights output from the collimator.

An eyebox may be placed in front of the diffractive optical element and spaced apart from the diffractive optical element by a viewing distance.

The eyebox may have a trapezoidal shape.

The viewing distance may be proportional to a width of the diffractive optical element at a same FOV.

The collimator may be one of an achromatic lens, a holographic optical element, and a parabolic mirror.

The diffractive optical element may include a slanted surface grating.

According to an embodiment of the present disclosure, a head-up display includes: a display having a plurality of pixels and configured to emit light from each of the plurality of pixels; a first collimator disposed in front of the display and configured to receive the light emitted from each pixel of the plurality of pixels of the display and output first light; a second collimator configured to receive the first light output from the first collimator and output collimated light by collimating the first light; and a diffractive optical element configured to receive the collimated light from the second collimator, diffract the collimated light, emit the collimated light at an angle substantially equal to an angle at which the collimated light is incident to the diffractive optical element, and generate a virtual image by the collimated light emitted from the diffractive optical element.

A distance between the first collimator and the display may be less than a focal distance of the first collimator.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present disclosure will become more apparent by describing in detail embodiments thereof with reference to the accompanying drawings, wherein.

DETAILED DESCRIPTION

Figure 1:
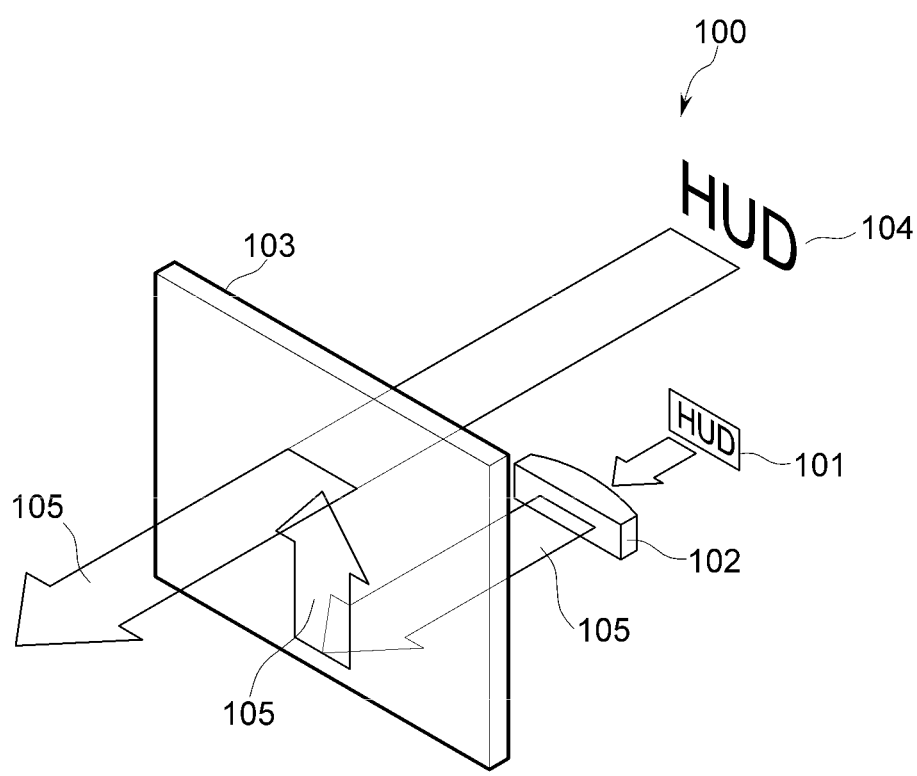
FIG. 1 is a perspective view schematically illustrating a head-up display according to an embodiment of the present disclosure.

Embodiments will now be described more fully hereinafter with reference to the accompanying drawings. Although the present disclosure may be modified in various manners and have several embodiments, exemplary embodiments are illustrated in the accompanying drawings and will be mainly described in the specification. However, the scope of the present disclosure is not limited to the exemplary embodiments and should be construed as including changes, equivalents and substitutions without deviating from the spirit and scope of the present disclosure.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or one or more intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or one or more intervening layers, areas, or plates may be present therebetween. Conversely, when a layer, area, or plate is referred to as being "directly below" another layer, area, or plate, intervening layers, areas, or plates may be absent therebetween.

The spatially relative terms, "below," "beneath," "lower," "above," "upper," and the like, may be used herein for ease of description to describe the relations between one element or component and another element or component as illustrated in the drawings. It will be understood that the spatially relative terms are intended to encompass different orientations of the object or device in use or operation, in addition to the orientation depicted in the drawings. For example, in the case where an object or a device illustrated in the drawing is turned over, the object or the device positioned "below" or "beneath" another device may be placed "above" another object or device. Accordingly, the illustrative term "below" may include both the lower and upper positions. The object or device may also be oriented in another direction and thus the spatially relative terms may be interpreted differently depending on the orientation.

Throughout the specification, when an element is referred to as being "connected" to another element, the element is "directly connected" to the other element, or "electrically connected" to the other element with one or more intervening elements interposed therebetween.

It will be further understood that the terms "comprises," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" may be termed "a second element" or "a third element," and "a second element" and "a third element" may be termed likewise without departing from the teachings herein.

"About" or "approximately" as used herein is inclusive of the stated value and means within an acceptable range of variation for the particular value as determined by one of ordinary skill in the art, considering the accuracy of measurement and an error associated with the measurement of a particular quantity (i.e., limitations of a measurement system). For example, "about" may mean within one or more standard variations, or within ±30%, 20%, 10%, or 5% of the stated value.

Unless otherwise defined, terms used herein (including technical and scientific terms) have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present disclosure.

Description of elements or parts that are not directly associated with the present disclosure or obvious to one of ordinary skill in the art may be omitted, and like reference numerals refer to like elements throughout the specification.

Hereinafter, a head-up display for automobiles, motorcycles, or other vehicles according to an embodiment of the present disclosure will be described in detail with reference to FIGS. 1 to 12B.

FIG. 1 is a perspective view schematically illustrating a head-up display according to an embodiment of the present disclosure.

Referring to FIG. 1, a head-up display 100 according to an embodiment of the present disclosure includes a display 101, a collimator 102, and a planar diffractive optical element 103.

The display 101 displays information for a driver of an automobile, a motorcycle, or other vehicles, and provides the information (i.e., in the form of light) to the planar diffractive optical element 103 through the collimator 102. The display 101 may be a small-sized (or micro-sized) display, for example, an organic light emitting diode ("OLED") display device, a liquid crystal display ("LCD") device, a digital micromirror device ("DMD"), or the like.

The display 101 emits (or outputs) light from each of pixels of the display 101. The light emitted (or output) from the display 101 passes through the collimator 102, and the collimator 102 converts the light that passes through pixels of the collimator 102 into a group of collimated lights that proceed in each different direction according to the pixel of the collimator 102.

A light 105 that has passed through the collimator 102 is incident to the planar diffractive optical element 103. The light 105 incident to the planar diffractive optical element 103 changes its propagation direction by optical diffraction. In one embodiment, the light 105 may be totally reflected while proceeding in the planar diffractive optical element 103. The light 105 is then output to the outside of the planar diffractive optical element 103. In one embodiment, the light 105 may be output at an angle substantially equal to an angle at which the light 105 is incident to the planar diffractive optical element 103 by optical diffraction again. The planar diffractive optical element 103 may be a thin type and may be a surface relief type.

The light 105 that is output to the outside of the planar diffractive optical element 103 may include a group of collimated lights, and thus an image that is produced by the collimated and diffracted lights is recognized as a virtual image 104 located at an infinite distance.

That is, the collimator 102 outputs collimated light onto the planar diffractive optical element 103 at an incident angle, the planar diffractive optical element 103 emits the light 105 at an angle substantially equal to the incidence angle of the collimated light that is output from the collimator 102, and the virtual image 104 is created by the light 105 that is emitted by the planar diffractive optical element 103.

Figure 2:
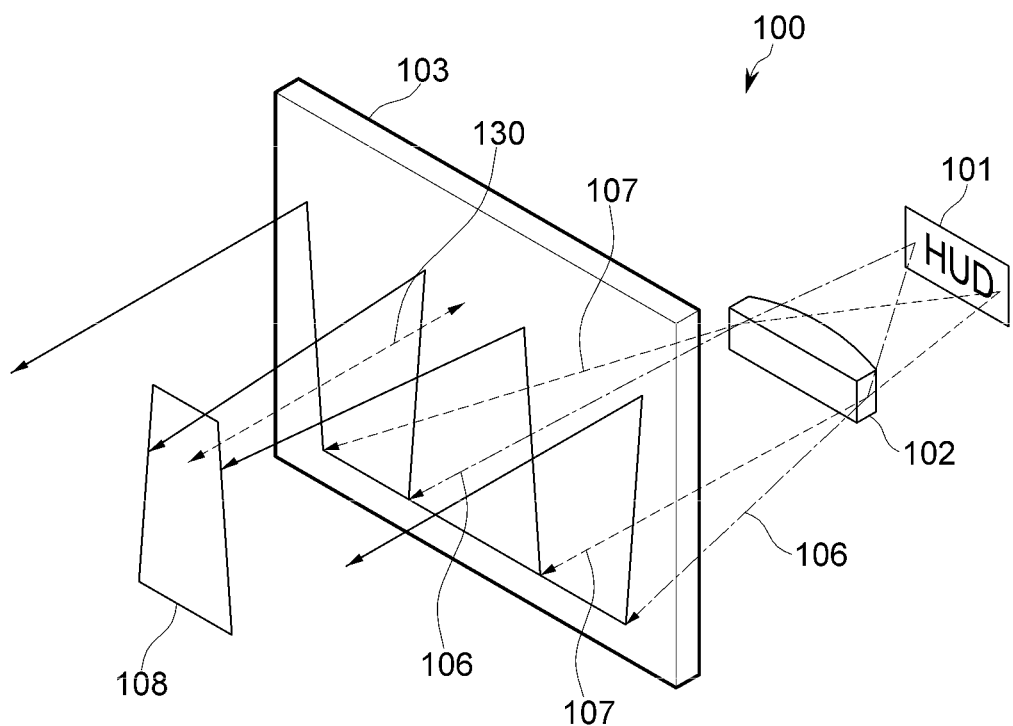
FIG. 2 is a view illustrating a process of generating an image of a head-up display according to an embodiment of the present disclosure.

FIG. 2 is a view illustrating a process of generating an image of a head-up display according to an embodiment of the present disclosure.

The lights emitted from the pixels of the display 101 are incident to the collimator 102. As illustrated in FIG. 2, lights 106 emitted from one pixel pass through the collimator 102 and proceed in parallel to each other to be incident to the planar diffractive optical element 103, and similarly, lights 107 emitted from another pixel pass through the collimator 102 and proceed in parallel to each other to be incident to the planar diffractive optical element 103.

The collimator 102 includes a light incidence surface to which the lights emitted from the display 101 are incident and a light emission surface from which the lights having passed through the collimator 102 and proceeding in a respectively parallel manner are output. One or both of the light incidence surface and the light emission surface may be a convexly curved surface.

That is, the lights emitted from the same pixel of the display 101 are incident to the light incident surface of the collimator 102, pass through the collimator 102, and exit the collimator 102 through the light emission surface as being parallel to each other. The lights that exit the collimator 102 are incident to the planar diffractive optical element 103, proceed in parallel to each other in the planar diffractive optical element 103, and are output to the outside of the planar diffractive optical element 103 in parallel to each other as well.

The lights 106 that are emitted from a first pixel on the left side of the display 101 pass through the collimator 102 and then proceed in parallel to each other. After being incident to the planar diffractive optical element 103, the lights 106 also proceed in parallel to each other in the planar diffractive optical element 103, and are output to the outside of the planar diffractive optical element 103 in parallel to each other.

The lights 107 emitted from a second pixel on the right side of the display 101 pass through the collimator 102 and then proceed in parallel to each other. After being incident to the planar diffractive optical element 103, the lights 107 also proceed in parallel to each other in the planar diffractive optical element 103, and are output to the outside of the planar diffractive optical element 103 in parallel to each other.

An eyebox 108 refers to a region in which a binocular vision can be maintained. That is, in the eyebox 108, the light having passed through the planar diffractive optical element 103 can be perceived by a human eye. The eyebox 108 is placed in front of the planar diffractive optical element 103 and spaced apart from the planar diffractive optical element 103 by a distance D.

The lights emitted from opposite side portions of the display 101 proceed in a respectively parallel manner after passing through the collimator 102, are incident to the planar diffractive optical element 103, proceed in the planar diffractive optical element 103 in a respectively parallel manner, and are output from the planar diffractive optical element 103 in a respectively parallel manner. In addition, a light 105 that has passed through the collimator 102 is incident to the planar diffractive optical element 103, is converted in terms of its propagation direction based on the principle of optical diffraction, is totally reflected while proceeding in the planar diffractive optical element 103, and output to the outside of the planar diffractive optical element 103 at an angle substantially equal to an angle at which the light 105 is incident to the planar diffractive optical element 103 based on the principle of optical diffraction again. Therefore, a light incident to the planar diffractive optical element 103 at an angle other than 0 degree is emitted from the planar diffractive optical element 103 at an angle substantially equal to the angle at which the light is incident to the planar diffractive optical element 103. The eyebox 108 may have a trapezoidal shape having a lower side longer than an upper side of the eyebox 108. In other words, the width of the eyebox 108 in which the driver can recognize a virtual image is wider at a lower portion compared to the width of the eyebox 108 at an upper portion.

Figure 3:
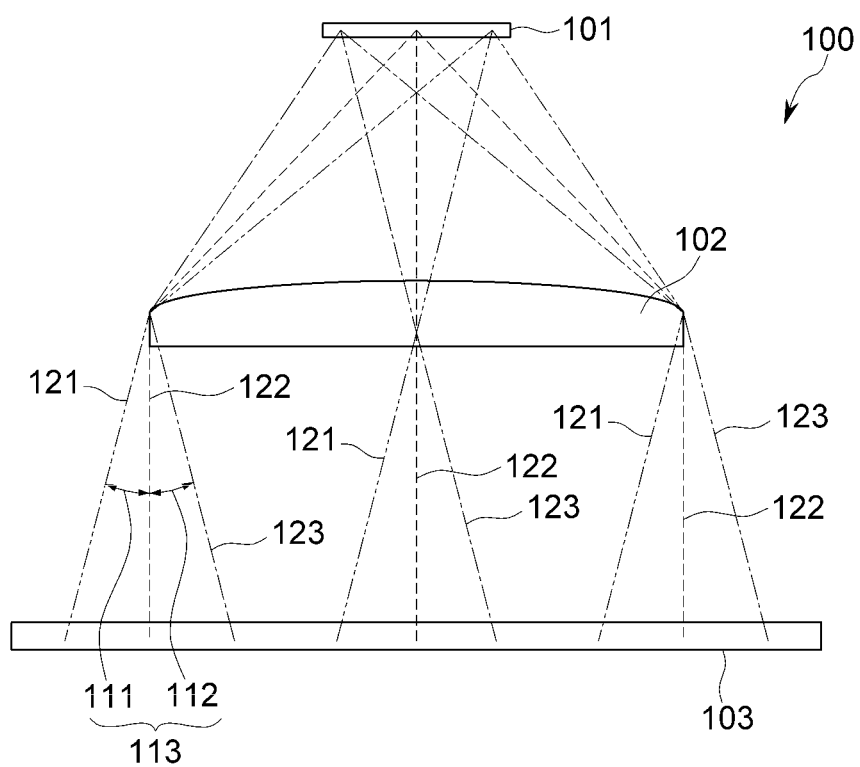
FIG. 3 is a top view illustrating a process of generating an image of a head-up display according to an embodiment of the present disclosure.

FIG. 3 is a top view illustrating a process of generating an image of a head-up display according to an embodiment of the present disclosure.

The collimator 102 is disposed apart from the display 101 by a focal distance. In addition, the planar diffractive optical element 103 is disposed apart from the collimator 102.

First lights 121 emitted from a left pixel of the display 101 proceed parallel to each other after passing through the collimator 102, and are incident to the planar diffractive optical element 103. Second lights 122 emitted from a center pixel of the display 101 proceed parallel to each other after passing through the collimator 102, and are incident to the planar diffractive optical element 103. Similarly, third lights 123 emitted from a right pixel of the display 101 proceed parallel to each other after passing through the collimator 102, and are incident to the planar diffractive optical element 103.

A field of view ("FOV") 113 refers to an angle formed by the light emitted from the center pixel of the display 101 and the lights emitted from the pixels at opposite side portions of the display 101 (e.g., the left pixel and the right pixel) after passing through the collimator 102. That is, the FOV 113 is a sum of a first angle between the first light 121 and the second light 122 and a second angle between the second light 122 and the third light 123.

The FOV 113 is proportional to a width of the display 101, and inversely proportional to the focal distance of the collimator 102. In addition, the FOV 113 may be increased when a width of the planar diffractive optical element 103 increases as the width of the display 101 increases.

A size of the head-up display 100 may be reduced as a distance between the collimator 102 and the planar diffractive optical element 103 decreases (e.g., toward zero), and/or the focal distance of the collimator 102 is reduced. In an embodiment, the head-up display 100 may be a combiner type.

When the focal distance of the collimator 102 is substantially minimized, the FOV 113 may increase substantially to the maximum.

That is, the FOV 113 and the eyebox 108 may be substantially optimized when the distance between the collimator 102 and the planar diffractive optical element 103 is reduced to zero, and the focal distance of the collimator 102 is substantially minimized.

As the FOV 113 increases, a size of the eyebox 108 is reduced. However, the reduced size of the eyebox 108 may be compensated by disposing a plurality of displays to generate a plurality of eyeboxes.

Figure 4:
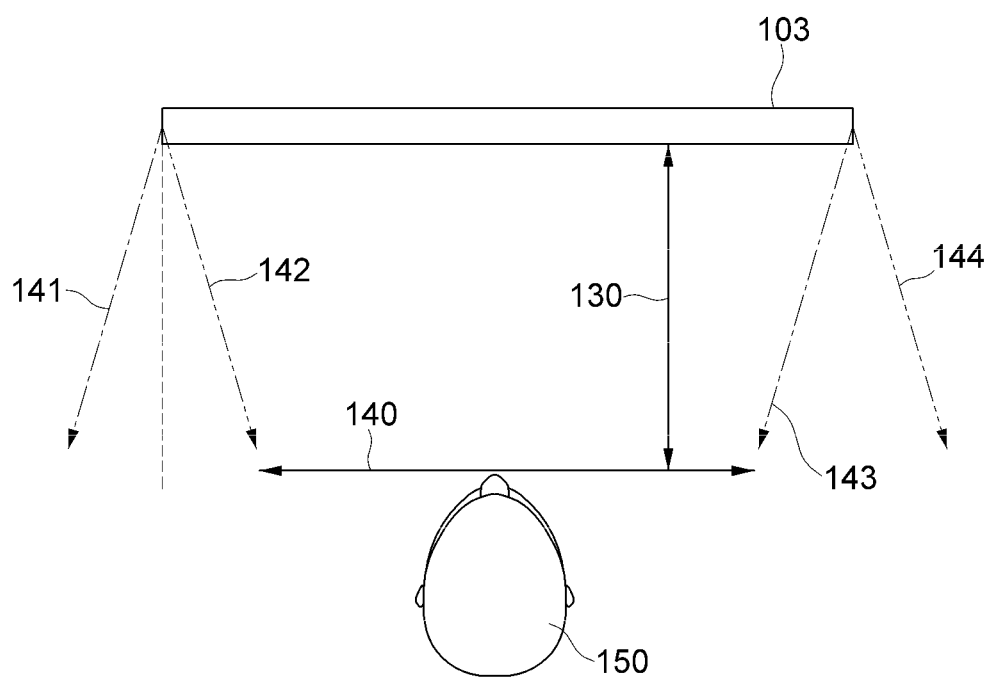
FIG. 4 is a top view illustrating the relationship between a head-up display according to an embodiment of the present disclosure.

FIG. 4 is a top view illustrating the relationship between a head-up display according to an embodiment of the present disclosure.

Referring to FIG. 4, the planar diffractive optical element 103 is placed apart from a driver 150 by a viewing distance 130. The lights emitted from the pixels of a display (e.g., the display 101 of FIGS. 1 to 3) pass through a collimator (e.g., the collimator 102 of FIGS. 1 to 3), are incident to the planar diffractive optical element 103, and are output from the planar diffractive optical element 103. A first light ray 141 and a second light ray 142 are emitted from a left side surface of the planar diffractive optical element 103, and a third light ray 143 and a fourth light ray 144 are emitted from a right side surface of the planar diffractive optical element 103.

A width 140 of an eyebox may correspond to a width of light that the driver 150 can perceive with both eyes as a virtual image. For example, the width 140 of the eyebox corresponds to a horizontal distance between the second light ray 142 and the third light ray 143 at the viewing distance 130 of the driver 150 from the planar diffractive optical element 103. That is, the driver 150 may perceive a virtual image in an area within the width 140.

Referring to FIGS. 2, 3 and 4, the FOV 113 is inversely proportional to the size of the eyebox 108. The size of the eyebox 108 is reduced as the FOV 113 increases. In addition, since the eyebox 108 is spaced apart from the planar diffractive optical element 103 by the viewing distance 130, the size of the eyebox 108 is reduced as the distance from the planar diffractive optical element 103 to the eyebox 108 increases.

Figure 5:
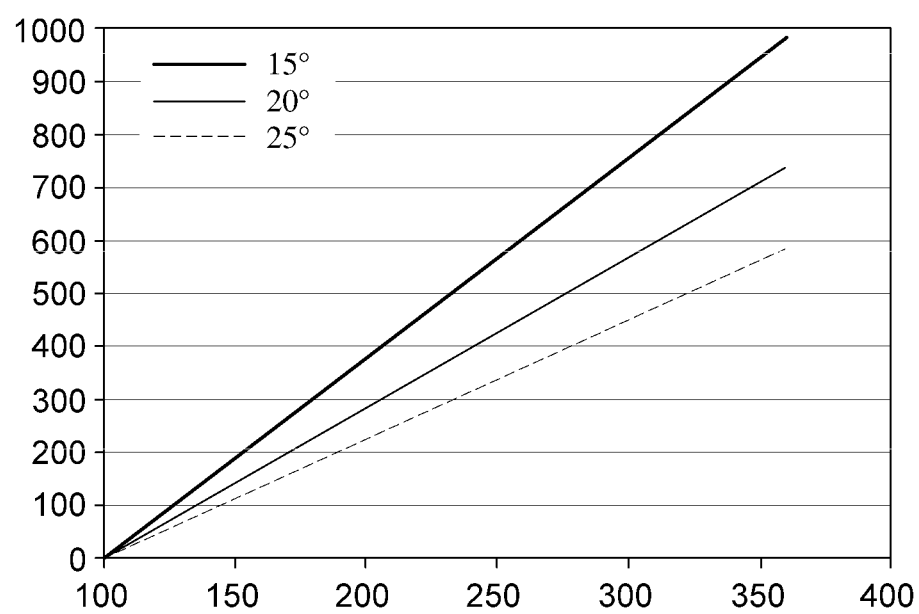
FIG. 5 is an example graph explaining the relationship between a size of a diffractive optical element and a viewing distance based on an FOV of the head-up display according to an embodiment of the present disclosure.

FIG. 5 is an example graph explaining the relationship between a size of a diffractive optical element and a viewing distance based on an FOV of a head-up display according to an embodiment of the present disclosure.

A horizontal axis in FIG. 5 represents a width, in millimeters (mm), of the diffractive optical element 103 in a long side direction. A vertical axis in FIG. 5 represents a distance, in millimeters (mm), between the diffractive optical element 103 and the driver 150.

Referring to FIGS. 3, 4, and 5, the FOV 113 of the diffractive optical element 103 that has the same width in the long side direction decreases, as the viewing distance 130 increases.

With respect to the same viewing distance 130, the FOV 113 increases, as the width of the diffractive optical element 103 in the long side direction increases. In addition, with respect to the same FOV 113, the viewing distance 130 is proportional to the width of the diffractive optical element 103.

Since the relationship between the width of the diffractive optical element 103 and the viewing distance 130 between the diffractive optical element 103 and the eyebox 108 of the driver 150 is in a linear relation at a certain FOV 113, the focal distance and the number of the displays 101 or the collimators 102 may be determined based on the linear relation.

Figure 6A:
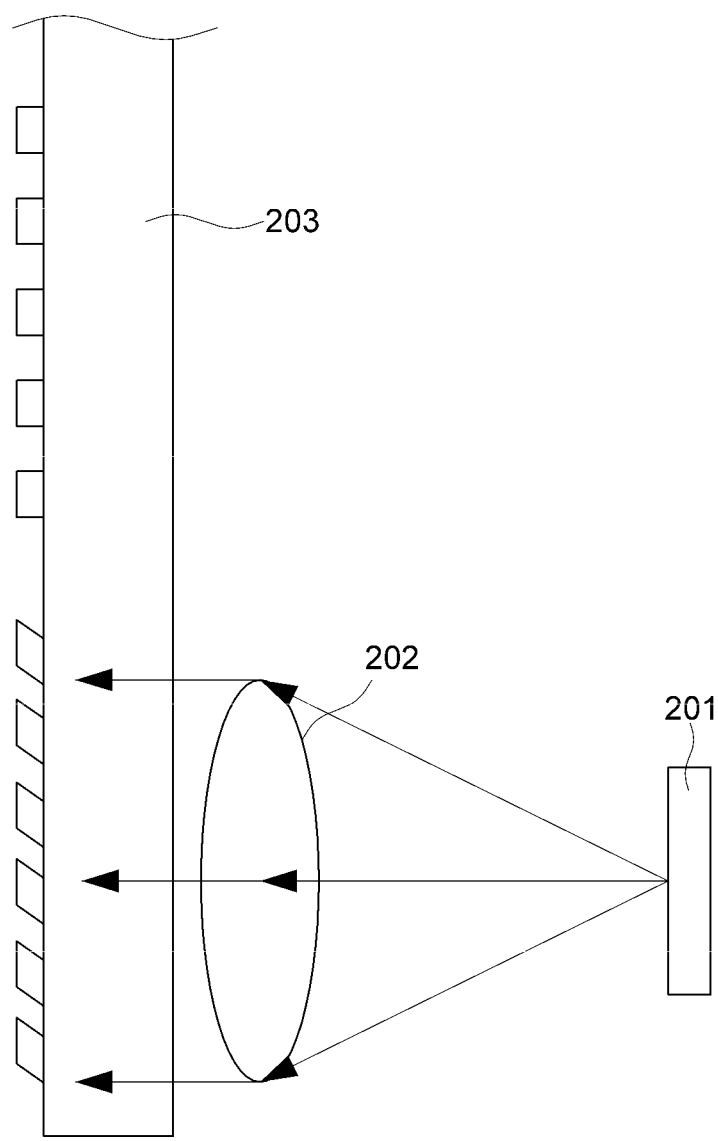
FIGS. 6A to 6C are cross-sectional views schematically illustrating a head-up display according to another embodiment of the present disclosure.
Figure 6B:
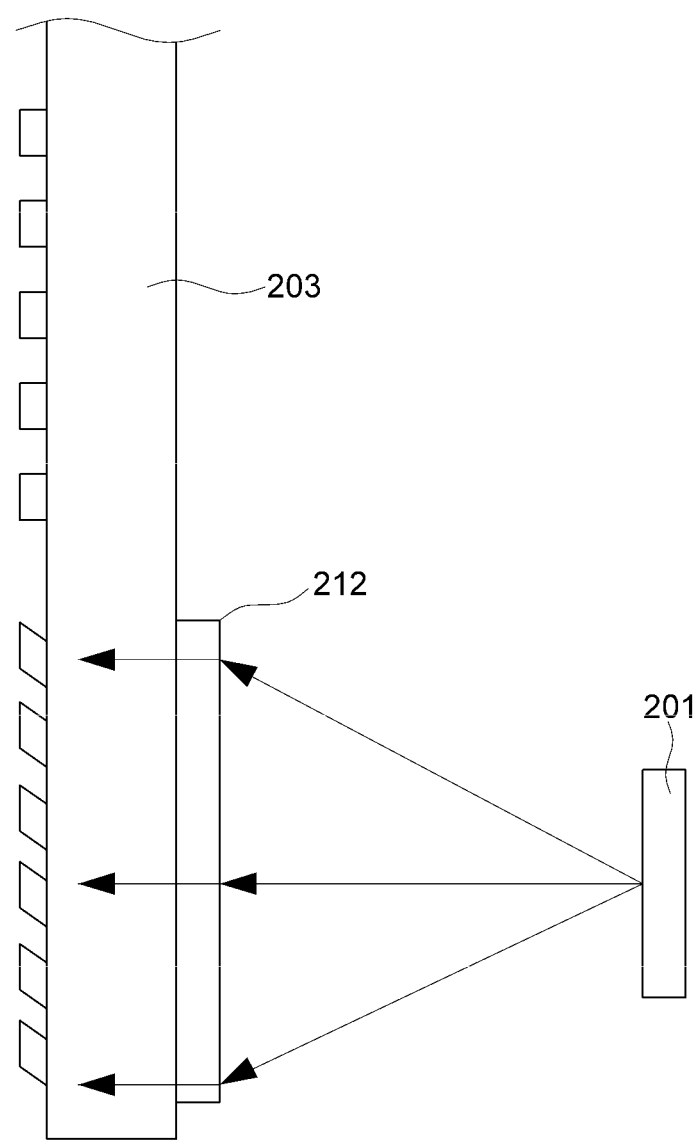
Figure 6C:
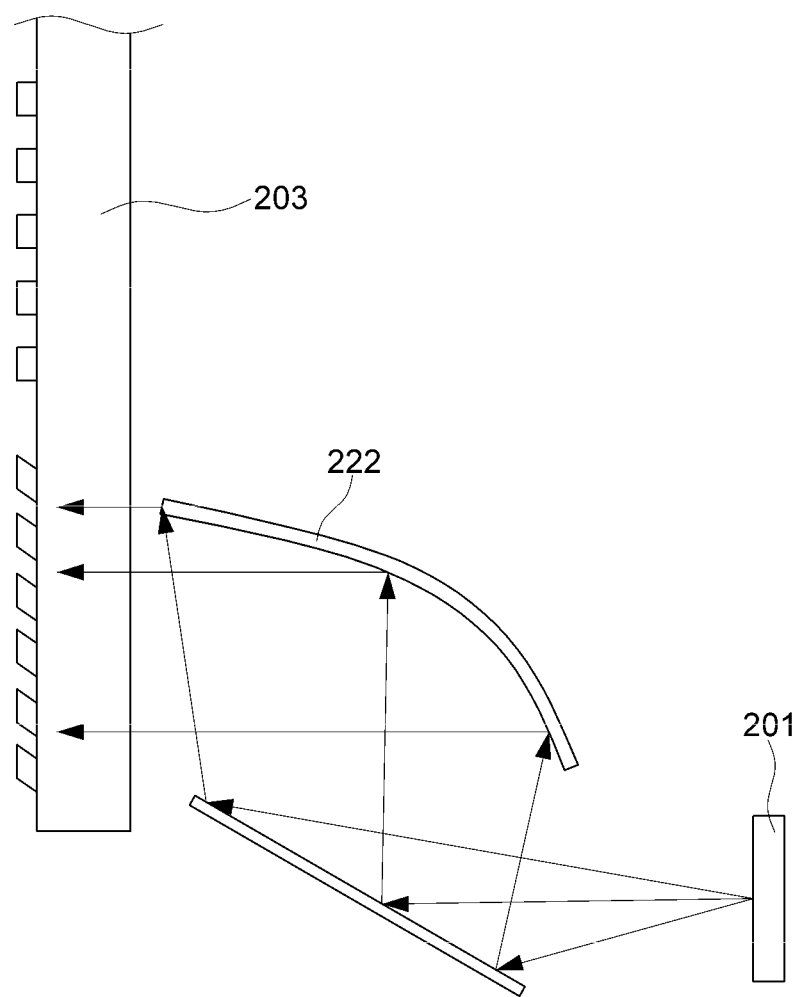

FIGS. 6A to 6C are cross-sectional views schematically illustrating a head-up display according to another embodiment of the present disclosure.

Referring to FIG. 6A, a head-up display according to another embodiment of the present disclosure includes a display 201, an achromatic lens 202, and a planar diffractive optical element 203.

Referring to FIG. 6B, a holographic optical element ("HOE") 212 may be used in place of the achromatic lens 202 in the head-up display illustrated in FIG. 6A according to another embodiment of the present disclosure. Alternatively, referring to FIG. 6C, a parabolic mirror 222 may be used in place of the achromatic lens 202 or the HOE 212 in the head-up display illustrated in FIGS. 6A and 6B according to another embodiment of the present disclosure. The achromatic lens 202, the HOE 212, and the parabolic mirror 222 may be used as a collimator in the head-up display.

In an optical device, lenses are commonly used and generally cheap to manufacture. However, the achromatic lens 202 is relatively expensive, it may have broadband aberration. Broadband aberration refers to the aberration that occurs for each wavelength.

The HOE 212 may be positioned close to or contact the planar diffractive optical element 203, and thus a size of the head-up display may be further reduced compared to that of the head-up display including the achromatic lens 202 or the parabolic mirror 222. However, it is necessary that an RGB light source that is divided according to the wavelength should be used in the HOE 212, and it is difficult to use an LED in the head-up display including the HOE 212.

In addition, the parabolic mirror 222 requires two or more mirrors, and it is difficult to manufacture an upper mirror having a parabolic shape. However, the parabolic mirror 222 has no broadband aberration and has suitable characteristics for color displays.

Figure 7:
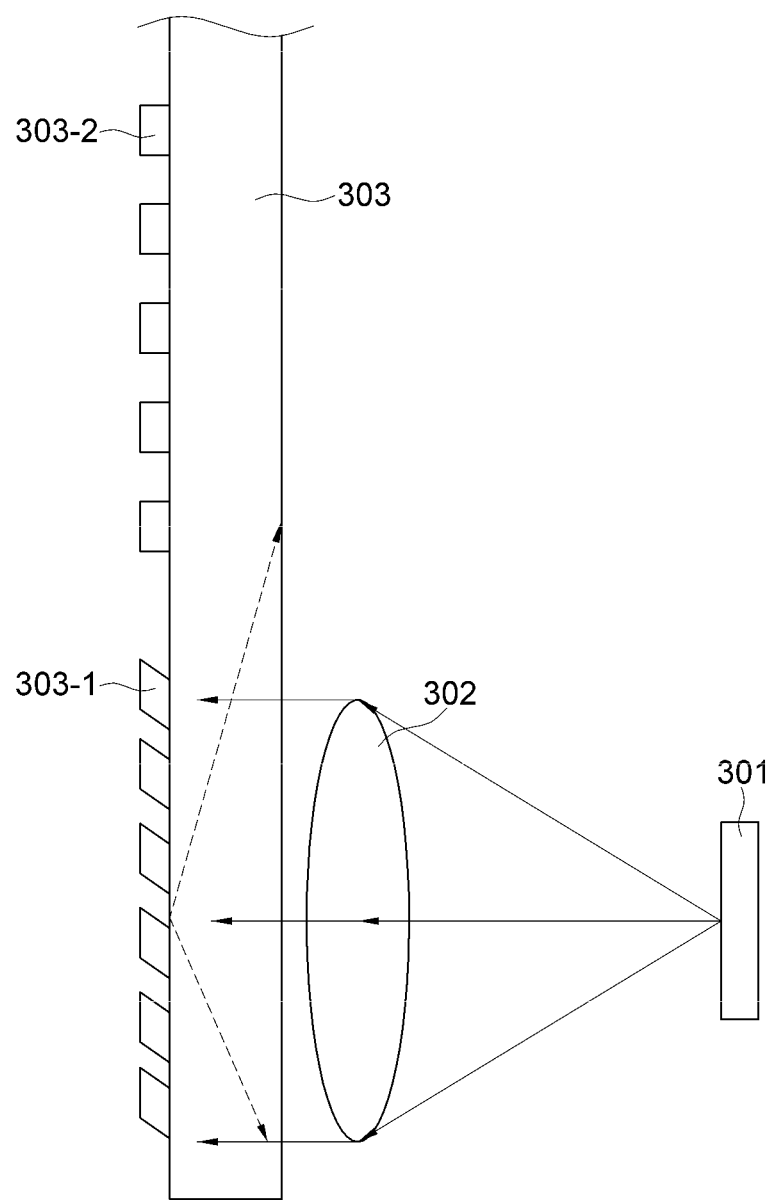
FIG. 7 is a cross-sectional view schematically illustrating a head-up display according to another embodiment of the present disclosure.

FIG. 7 is a cross-sectional view schematically illustrating a head-up display according to another embodiment of the present disclosure.

A light emitted from a display 301 is converted into a collimated light while passing through a collimator 302, and is incident to a planar diffractive optical element 303. The planar diffractive optical element 303 includes a light incidence surface to which the light is incident and a light emission surface from which the light is emitted, and the light emission surface is formed at an upper portion of one surface of the planar diffractive optical element 303.

In one embodiment, a common surface grating 303-2 is formed on the light emission surface of the planar diffractive optical element 303. The light incidence surface is formed at a lower portion of another surface of the planar diffractive optical element 303 that opposes the light emission surface, and a slanted surface grating 303-1 is formed at the lower portion of the planar diffractive optical element 303 opposite to the light incident surface.

A light incident to the planar diffractive optical element 303 is diffracted by the slanted surface grating 303-1 at the lower portion of the planar diffractive optical element 303, and proceeds in a different direction. The light may proceed upwards or downwards. In the embodiment illustrated in FIG. 7, the slanted surface grating 303-1 that includes gratings inclined in one direction may be used to substantially maximize an amount of upward light and substantially minimize an amount of downward light.

In other embodiments, both of the common surface grating 303-2 or the slanted surface grating 303-1 may be used at or in the vicinity of the light emission surface to substantially maximize the overall luminous efficiency.

The slanted surface grating 303-1 may adjust diffraction efficiency in an asymmetric manner according to the order of diffraction, and may guide light only in one direction.

Figure 8:
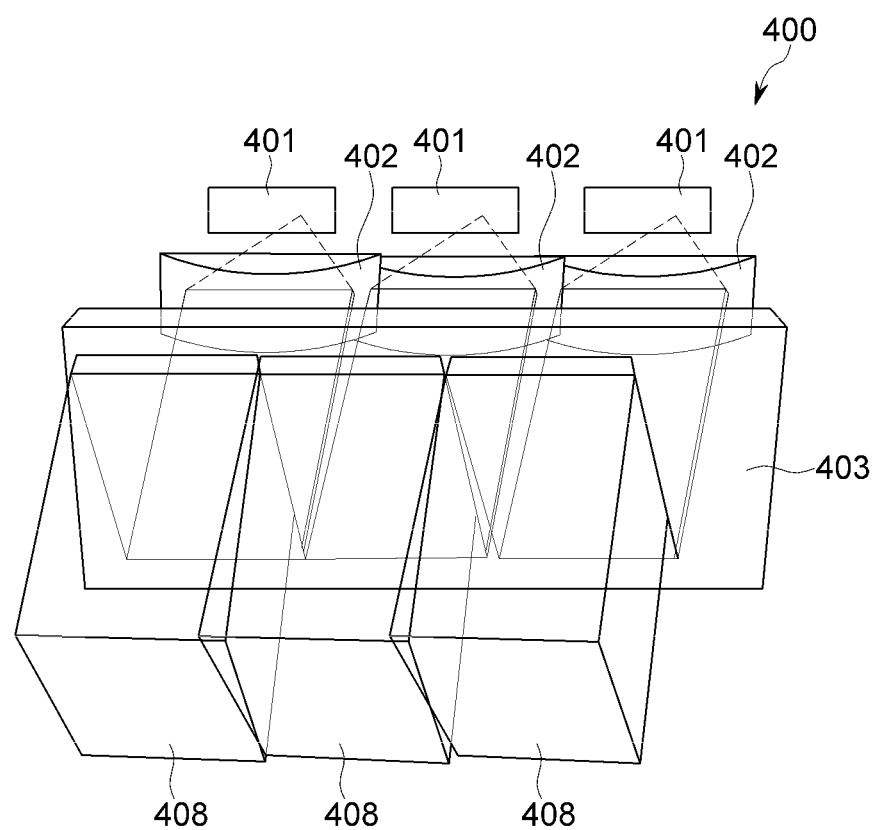
FIG. 8 is a perspective view schematically illustrating a head-up display according to another embodiment of the present disclosure.

FIG. 8 is a perspective view schematically illustrating a head-up display according to another embodiment of the present disclosure.

Referring to FIG. 8, a head-up display 400 according to another embodiment of the present disclosure includes a plurality of displays 401, a plurality of collimators 402, and a planar diffractive optical element 403.

A size of the head-up display may be reduced as a distance between the collimators 402 and the planar diffractive optical element 403 decreases (e.g., toward zero) and a focal distance of the collimators 402 is significantly minimized. When the focal distance of the collimators 402 is substantially minimized, an FOV may increase substantially to the maximum.

That is, the FOV and an eyebox 408 may be substantially optimized when the distance between the collimator 402 and the planar diffractive optical element 403 is reduced to zero, and the focal distance of the collimators 402 is substantially minimized.

In such an embodiment, as the FOV increases, a size of the eyebox 408 is reduced. However, the reduced size of the eyebox 408 may be compensated by disposing the plurality of displays 401 and the plurality of collimators 402 corresponding to the plurality of displays 401 in a one-to-one correspondence manner, and generating a plurality of eyeboxes 408.

Since the light emitted from the planar diffractive optical element 403 is collimated light, although the driver's eyes are respectively placed in different eyeboxes, there is no influence on the driver's recognition of a virtual image corresponding to an image displayed by the plurality of displays 401.

Figure 9A:
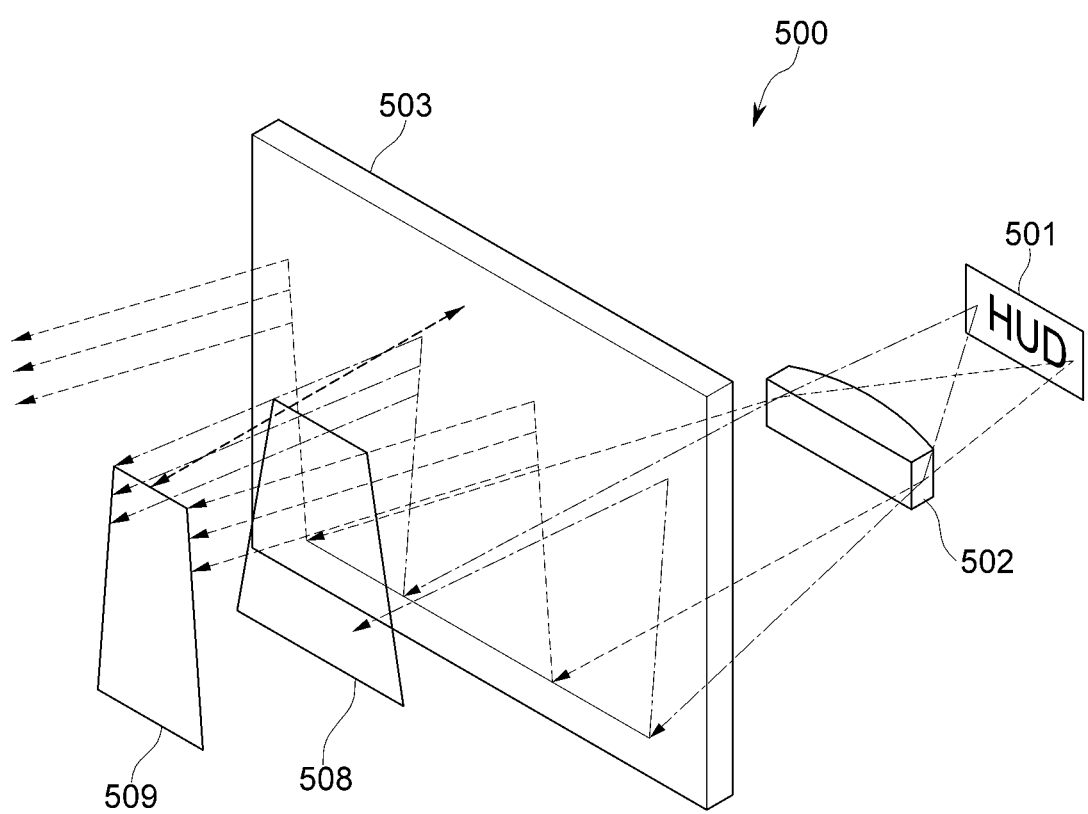
FIG. 9A is a perspective view schematically illustrating a head-up display according to another embodiment of the present disclosure.
Figure 9B:
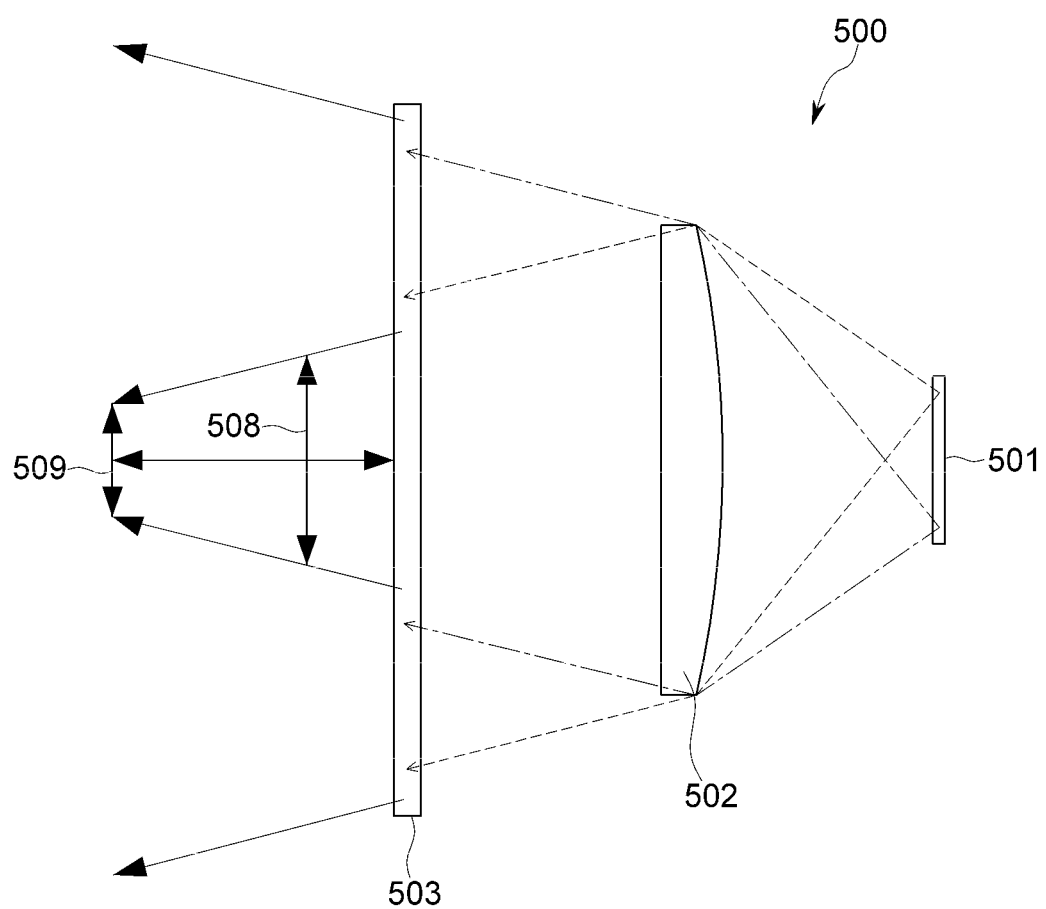
FIG. 9B is a plan view schematically illustrating the head-up display of FIG. 9A.

FIG. 9A is a perspective view schematically illustrating a head-up display according to another embodiment of the present disclosure, and FIG. 9B is a plan view schematically illustrating the head-up display of FIG. 9A.

Referring to FIGS. 9A and 9B, a head-up display 500 according to another embodiment of the present disclosure includes a display 501, a collimator 502, and a planar diffractive optical element 503. The display 501, the collimator 502, and the planar diffractive optical element 503 have been described above, and detailed description thereof will be omitted.

Eyeboxes 508 and 509 that are trapezoidal in shape are placed at the driver's position, and sizes of the eyeboxes 508 and 509 may vary depending on the driver's position.

A light incident to the planar diffractive optical element 503 at an angle other than 0 degree is emitted from the planar diffractive optical element 503 at an angle substantially equal to the angle at which the light is incident to the planar diffractive optical element 503. In addition, as a distance from the planar diffractive optical element 503 to the eyeboxes 508 and 509 increases, a width between respective lights emitted from different pixels of the display 501 decreases, and thus the sizes of the trapezoidal eyeboxes 508 and 509 may be reduced as well.

In other words, as a distance from the planar diffractive optical element 503 to the eyeboxes 508 and 509 increases, widths of the eyeboxes 508 and 509 decrease, and the sizes of the eyeboxes 508 and 509 are reduced. Accordingly, an area in which the driver can recognize a virtual image may be reduced.

Figure 10A:
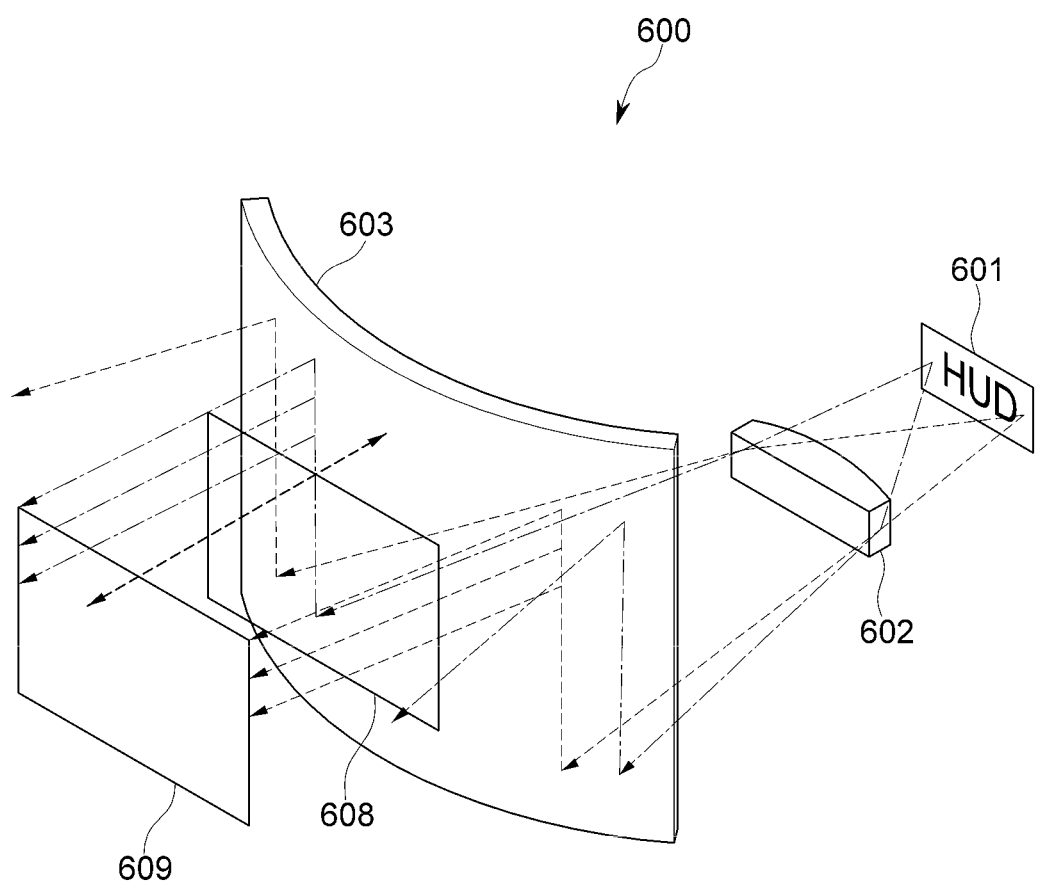
FIG. 10A is a perspective view schematically illustrating a head-up display according to another embodiment of the present disclosure.
Figure 10B:
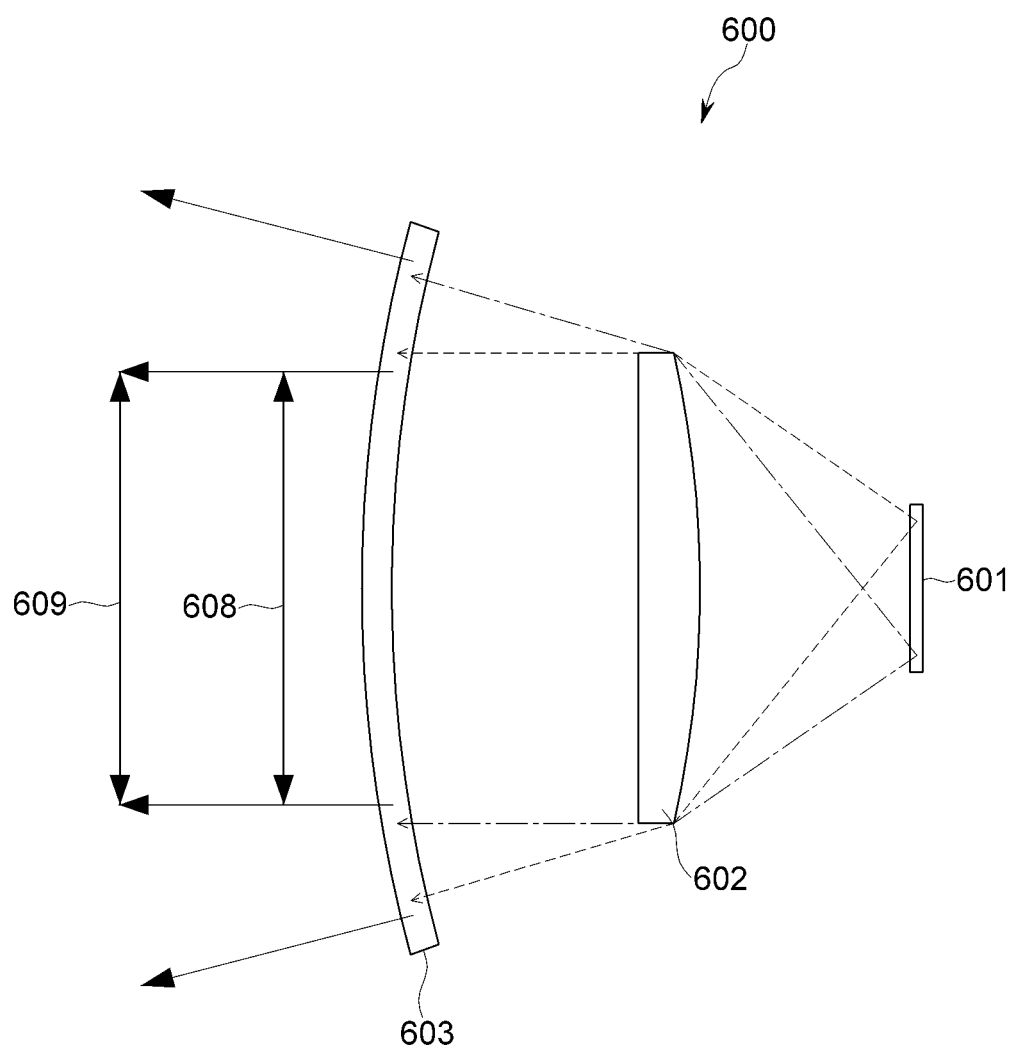
FIG. 10B is a plan view schematically illustrating the head-up display of FIG. 10A.

FIG. 10A is a perspective view schematically illustrating a head-up display according to another embodiment of the present disclosure, and FIG. 10B is a plan view schematically illustrating the head-up display of FIG. 10A.

Referring to FIGS. 10A and 10B, a head-up display 600 according to another embodiment of the present disclosure includes a display 601, a collimator 602, and a curved diffractive optical element 603. The display 601 and the collimator 602 have been described above, and detailed description thereof will be omitted.

The curved diffractive optical element 603 includes a light incidence surface and a light emission surface. One or both of the light incidence surface and the light emission surface are curved convexly in a direction opposite to the collimator 602 (i.e., a direction further away from the collimator 602).

An emission angle of light emitted from the curved diffractive optical element 603 may be adjusted by adjusting a curvature of the curved diffractive optical element 603, so that lights emitted from different pixels of the display 601 are emitted from the curved diffractive optical element 603 in parallel to each other. Accordingly, eyeboxes 608 and 609 may have a constant quadrangular size, irrespective of a viewing distance and height from the curved diffractive optical element 603.

In other words, the eyeboxes 608 and 609 of the head-up display 600 have constant widths and sizes irrespective of the viewing distance and height from the curved diffractive optical element 603. Accordingly, a region in which the driver can recognize a virtual image is constant, irrespective of the viewing distance and height from the curved diffractive optical element 603.

However, when the curved diffractive optical element 603 is used, a virtual image may be generated at a finite distance, not at infinity, and a distance of the virtual image from the eyeboxes 608 and 609 may be calculated based on the curvature of the curved diffractive optical element 603.

Figure 11:
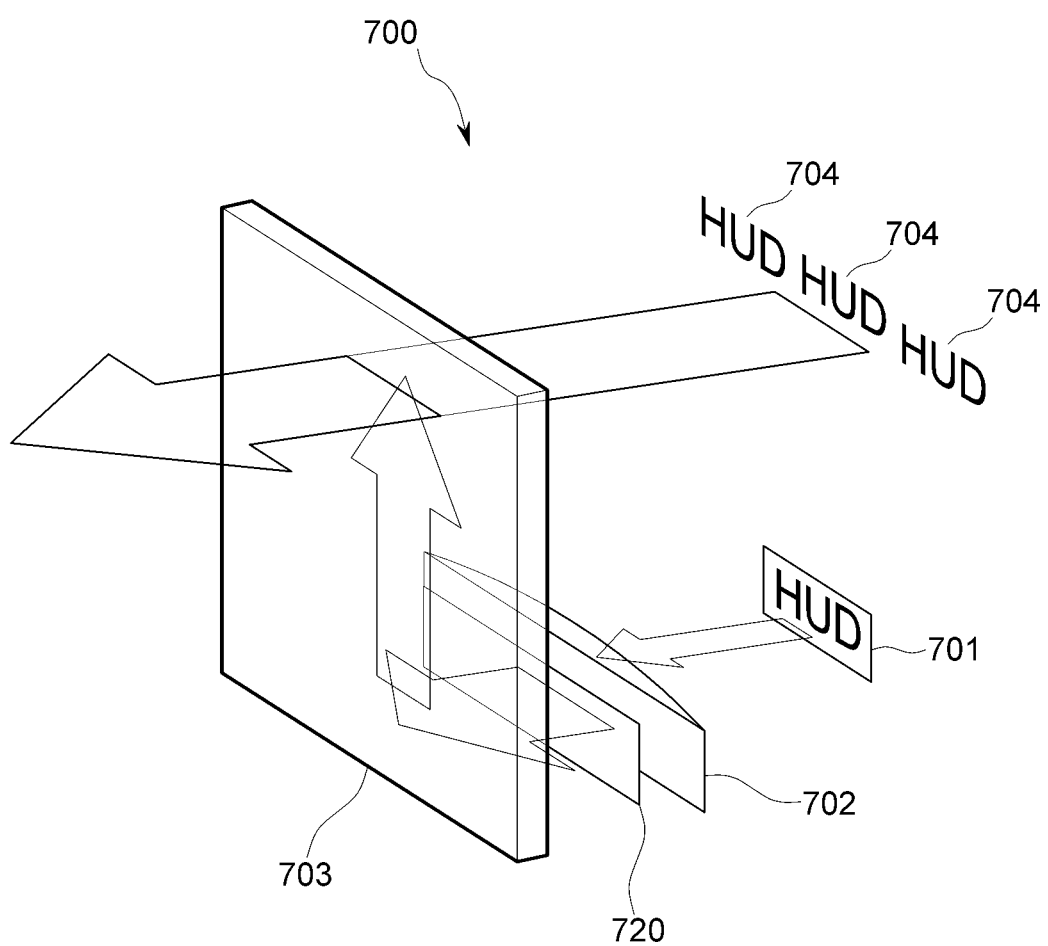
FIG. 11 is a perspective view schematically illustrating a head-up display according to another embodiment of the present disclosure.

FIG. 11 is a perspective view schematically illustrating a head-up display 700 according to another embodiment of the present disclosure.

Referring to FIG. 11, a head-up display 700 according to another embodiment of the present disclosure includes a display 701, a collimator 702, a planar diffractive optical element 703, and a beam steering apparatus 720 disposed between the collimator 702 and the planar diffractive optical element 703. The display 701, the collimator 702, and the planar diffractive optical element 703 have been described above, and detailed description thereof will be omitted.

The beam steering apparatus 702 may be of a liquid crystal type or the like. The beam steering apparatus 702 may shift light that is emitted from the collimator 702, left and right, or up and down, so that a position of a virtual image 704 that is generated by an image output from the planar diffractive optical element 703 may move in an eyebox.

The beam steering apparatus 702 may increase an FOV, limited to a size of the display 701, substantially to the maximum available in the head-up display 700.

The size of the display 701 may typically be less than one inch, and the beam steering apparatus 702 may be used in an augmented reality ("AR") head-up display to increase an FOV suitable for the AR head-up display.

In addition, the beam steering apparatus 720 may be provided at a light emission portion of the planar diffractive optical element 703 to increase the FOV.

Figure 12A:
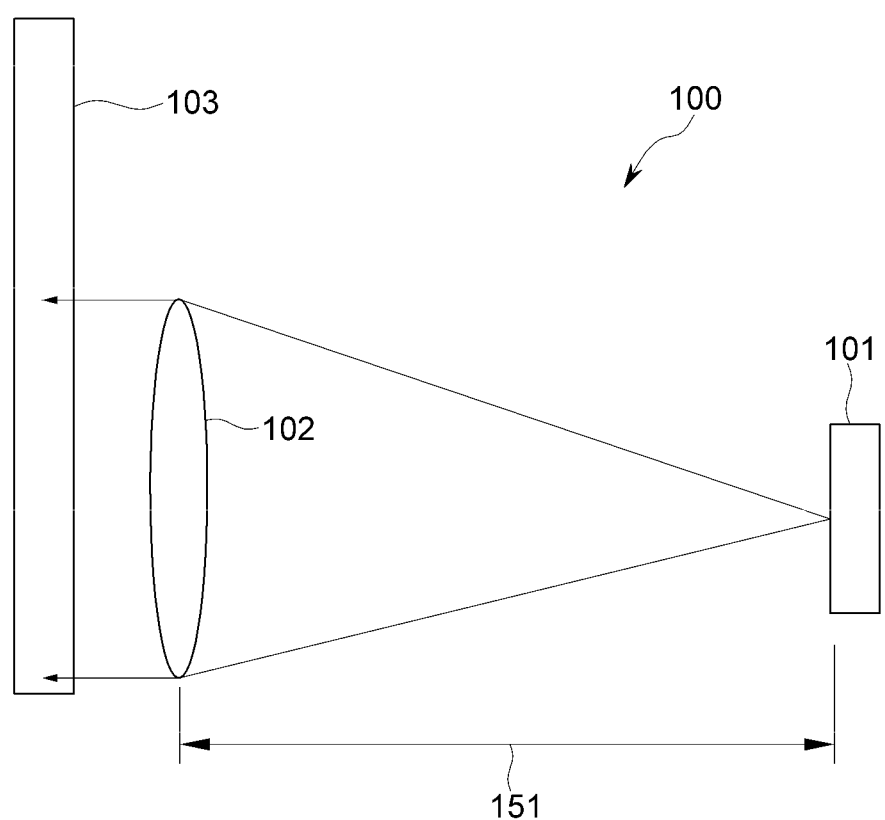
FIG. 12A is a cross-sectional view schematically illustrating a head-up display according to an embodiment of the present disclosure.
Figure 12B:
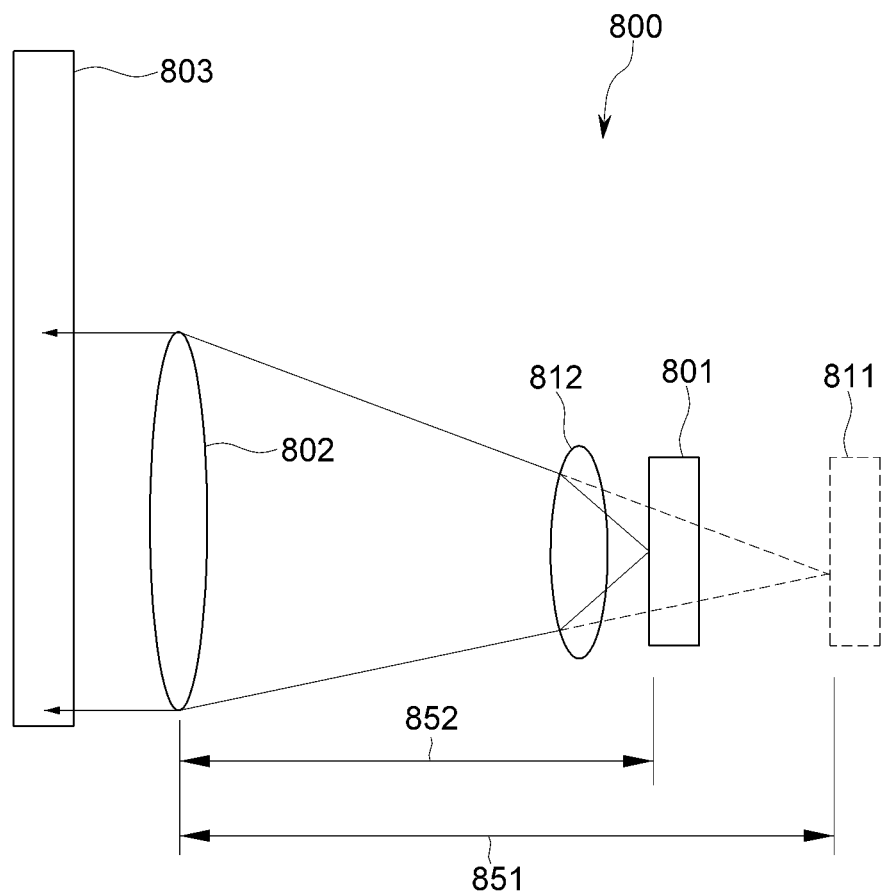
FIG. 12B is a cross-sectional view schematically illustrating a head-up display according to another embodiment of the present disclosure.

FIG. 12A is a cross-sectional view schematically illustrating a head-up display according to an embodiment of the present disclosure, and FIG. 12B is a cross-sectional view schematically illustrating a head-up display according to another embodiment of the present disclosure.

Referring to FIG. 12A, the head-up display 100 according to an embodiment of the present disclosure includes the display 101, the collimator 102, and the planar diffractive optical element 103. A focal distance 151 of the collimator 102 coincides with a distance 151 between the display 101 and the collimator 102.

The size of the head-up display 100 may be reduced as the focal distance 151 decreases. However, it is not easy to manufacture a lens having a relatively short focal distance 151, and the short focal distance 151 may cause a price increase.

Referring to FIG. 12B, a head-up display 800 according to another embodiment of the present disclosure includes a display 801, a second collimator 812 disposed in front of the display 801, a planar diffractive optical element 803, and a first collimator 802 disposed between the second collimator 812 and the planar diffractive optical element 803.

The second collimator 812 is disposed in front of the display 801 toward the first collimator 802, and converts a direction of light emitted from the display 801 that is incident to the light to the first collimator 802.

Because the second collimator 812 is disposed between the display 801 and the first collimator 802, a distance 852 between the display 801 and the first collimator 802 may be reduced to be less than a distance 851 between a virtual display 811 and the first collimator 802 to achieve an equivalent focal distance. Accordingly, the size of the head-up display may be reduced.

In one embodiment, the second collimator 812 may be manufactured in a size substantially equal to or similar to a size of the display 801. In addition, the second collimator 812 may be manufactured by a plastic molding method, and thus does not significantly affect the price increase.

As set forth hereinabove, the head-up display for automobiles, motorcycles, or other vehicles, for example, a combiner type head-up display including a display, one or more collimators, and a diffractive optical element, according to one or more embodiments may be reduced in size, and the size of an area in which the drivers can recognize a virtual image may be enlarged to a substantially maximum extent.

Further, the head-up display according to one or more embodiments may expand the FOV without increasing the size of the head-up display.

In addition, the head-up display according to one or more embodiments may generate a virtual image at infinity to allow drivers to view the virtual image without shifting their focal point.

While the present disclosure has been illustrated and described with reference to the embodiments thereof, it will be apparent to those of ordinary skill in the art that various changes in form and detail may be formed thereto without departing from the spirit and scope of the present disclosure.

What is claimed is:

1. A head-up display comprising:
  a plurality of displays having a plurality of pixels and configured to emit lights from each of the plurality of pixels;
  a plurality of collimators configured to receive the lights emitted from each pixel of the plurality of pixels of the plurality of displays and output collimated lights by collimating the lights; and a diffractive optical element configured to receive the collimated lights from the plurality of collimators, diffract the collimated lights to proceed in an upward or downward direction with respect to a plane in which the collimated lights propagate from the plurality of collimators, emit the collimated lights at angles substantially equal to respective angles at which the collimated lights are incident to the diffractive optical element, respectively, and generate a virtual image by the collimated lights emitted from the diffractive optical element, wherein the collimated lights are incident to the diffractive optical element on a first side of the diffractive optical element, proceed in the diffractive optical element, and emit from a second side of the diffractive optical element that is opposite to the first side in a substantially same direction as the collimated lights incident to the diffractive optical element.

2. The head-up display of claim 1, wherein the plurality of displays correspond to the plurality of collimators in a one-to-one correspondence.

3. The head-up display of claim 1, wherein an eyebox having a first width covering both eyes of a viewer is placed in front of the diffractive optical element and spaced apart from the diffractive optical element by a viewing distance, and the viewer is capable of perceiving the virtual image within the first width of the eyebox.

4. The head-up display of claim 3, wherein the eyebox has a trapezoidal shape.

5. The head-up display of claim 3, wherein the viewing distance is proportional to a second width of the diffractive optical element at a same field of view (FOV).

6. The head-up display of claim 1, wherein the collimator is one of an achromatic lens, a holographic optical element, and a parabolic mirror.

7. The head-up display of claim 1, wherein the diffractive optical element comprises a slanted surface grating.

8. A head-up display comprising:
a display having a plurality of pixels and configured to emit lights from each of the plurality of pixels;
a collimator configured to receive the lights emitted from each pixel of the plurality of pixels of the display and output collimated lights by collimating the lights; and
a diffractive optical element configured to receive the collimated lights from the collimator, diffract the collimated lights to proceed in an upward or downward direction with respect to a plane in which the collimated lights propagate from the collimator, emit the collimated lights at angles substantially equal to respective angles at which the collimated lights are incident to the diffractive optical element, respectively, and generate a virtual image by the collimated lights emitted from the diffractive optical element,
wherein the diffractive optical element comprises a light incidence surface and a light emission surface,
wherein at least one of the light incidence surface and the light emission surface is a curved surface,
wherein the curved surface is convex toward a direction away from the collimator, and
wherein the collimated lights are incident to the diffractive optical element on a first side of the diffractive optical element, proceed in the diffractive optical element, and emit from a second side of the diffractive optical element that is opposite to the first side in a substantially same direction as the collimated lights incident to the diffractive optical element.

9. The head-up display of claim 8, wherein an eyebox having a width covering both eyes of a viewer is placed in front of the diffractive optical element and spaced apart from the diffractive optical element by a viewing distance, the viewer is capable of perceiving the virtual image within the width of the eyebox.

10. The head-up display of claim 9, wherein the eyebox has a rectangular shape.

11. The head-up display of claim 8, wherein the collimator is one of an achromatic lens, a holographic optical element, and a parabolic mirror.

12. The head-up display of claim 8, wherein the diffractive optical element comprises a slanted surface grating.

13. A head-up display comprising:
a display having a plurality of pixels and configured to emit lights from each of the plurality of pixels;
a collimator configured to receive the lights emitted from each pixel of the plurality of pixels of the display and output collimated lights by collimating the lights;
a diffractive optical element configured to receive the collimated lights from the collimator, diffract the collimated lights to proceed in an upward or downward direction with respect to a plane in which the collimated lights propagate from the collimator, emit the collimated lights at angles substantially equal to respective angles at which the collimated lights are incident to the diffractive optical element, respectively, and generate a virtual image by the collimated lights emitted from the diffractive optical element; and
a beam steering apparatus disposed between the collimator and the diffractive optical element, wherein the beam steering apparatus is configured to adjust directions of the collimated lights output from the collimator,
wherein the collimated lights are incident to the diffractive optical element on a first side of the diffractive optical element, proceed in the diffractive optical element, and emit from a second side of the diffractive optical element that is opposite to the first side in a substantially same direction as the collimated lights incident to the diffractive optical element.

14. The head-up display of claim 13, wherein an eyebox having a first width covering both eyes of a viewer is placed in front of the diffractive optical element and spaced apart from the diffractive optical element by a viewing distance, and the viewer is capable of perceiving the virtual image within the first width of the eyebox.

15. The head-up display of claim 14, wherein the eyebox has a trapezoidal shape.

16. The head-up display of claim 14, wherein the viewing distance is proportional to a second width of the diffractive optical element at a same FOV.

17. The head-up display of claim 13, wherein the collimator is one of an achromatic lens, a holographic optical element, and a parabolic mirror.

18. The head-up display of claim 13, wherein the diffractive optical element comprises a slanted surface grating.

19. A head-up display comprising:
a display having a plurality of pixels and configured to emit light from each of the plurality of pixels;
a first collimator disposed in front of the display and configured to receive the light emitted from each pixel of the plurality of pixels of the display and output first light;
a second collimator configured to receive the first light output from the first collimator and output collimated light by collimating the first light; and a diffractive optical element configured to receive the collimated light from the second collimator, diffract the collimated light to proceed in an upward or downward direction with respect to a plane in which the collimated lights propagate from the second collimator, emit the collimated light at an angle substantially equal to an angle at which the collimated light is incident to the diffractive optical element, and generate a virtual image by the collimated light emitted from the diffractive optical element, wherein the collimated lights are incident to the diffractive optical element on a first side of the diffractive optical element, proceed in the diffractive optical element, and emit from a second side of the diffractive optical element that is opposite to the first side in a substantially same direction as the collimated lights incident to the diffractive optical element.

20. The head-up display of claim 19, wherein a distance between the first collimator and the display is less than a focal distance of the first collimator.

* * * * *